United States Patent [19]

Khalil

[11] Patent Number: 4,787,702

[45] Date of Patent: Nov. 29, 1988

[54] FIBER OPTIC CABLE AND METHOD OF MAKING THE SAME

[75] Inventor: Hanna T. Khalil, Houston, Tex.

[73] Assignee: Mark Products, Inc., Houston, Tex.

[21] Appl. No.: 112,236

[22] Filed: Oct. 26, 1987

[51] Int. Cl.$^4$ .................................... G02B 6/44
[52] U.S. Cl. ..................................... 350/96.23
[58] Field of Search ................. 350/96.23; 57/59, 62, 57/63, 64, 362

[56] References Cited

U.S. PATENT DOCUMENTS 4,723,831  2/1988  Johnson et al. ............... 350/96.23

Primary Examiner—William L. Sikes
Assistant Examiner—Robert E. Wise
Attorney, Agent, or Firm—Vaden, Eickenroht, Thompson & Boulware

[57] ABSTRACT

A cable is disclosed having two optical fibers spaced apart by portions of two strands of fibrous material laid with the optical fibers that is made by laying the two optical fibers and two strands of fibers with the serve angle of the strands of fibrous material being less than the serve angle of the optical fibers and at 90° thereto to cause the optical fibers to be held apart by portions of the fibers making up the strands. Tape is wrapped around the twisted optical fibers and strands of fibrous material after which the laid optical fibers and the fiber strands are enclosed in an outer jacket.

50 Claims, 2 Drawing Sheets

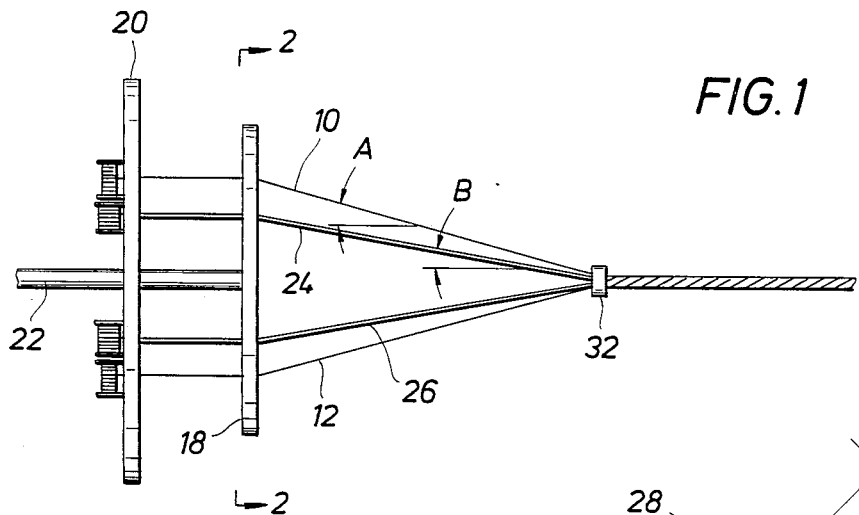
FIG.1
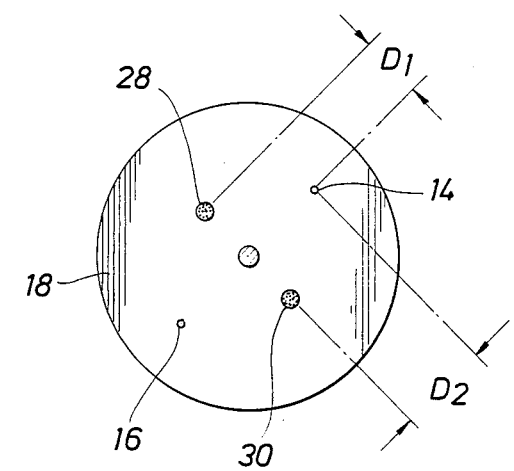
FIG.2
FIG.3
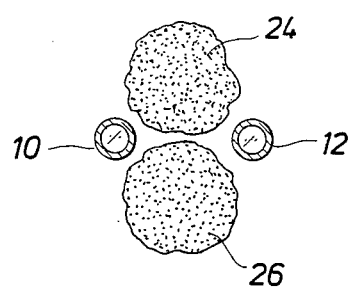
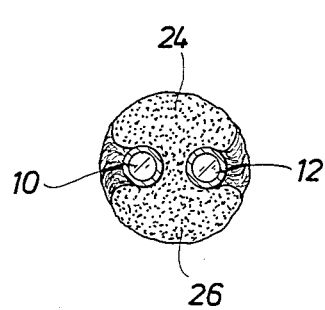
FIG.4
FIG.5
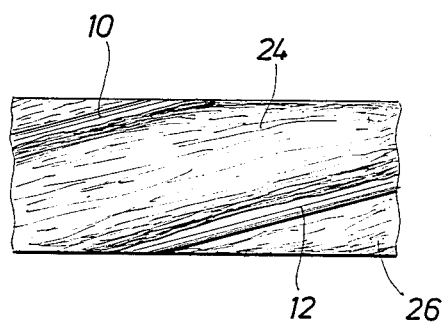

FIBER OPTIC CABLE AND METHOD OF MAKING THE SAME

This invention relates to fiber optic cables generally, and in particular to fiber optic cables where the optic fibers are twisted around the longitudinal axis of the cable and to a method of making such a cable.

Optic fibers are generally always protected by a buffer that surrounds the optical fiber. There are two types, a loose buffer and a tight buffer. In the loose buffer construction, a plastic tube having an inner diameter substantially larger than the fiber itself is used to cover the fiber. The advantage of this arrangement is that the optic fiber is well protected from outside mechanical forces. In the tight buffer construction, a thick coating is placed directly on the optic fiber, which results in the diameter of the tight buffer optic fiber being smaller than that of the same optic fiber with the loose tube construction.

It is an object of this invention to provide a cable having optical fibers with a tight buffer that is so constructed that the optic fibers have the protection of the loose tube buffer while retaining the tight buffer tube flexibility in handling.

It is a further object and advantage of this invention to provide a cable of optic fibers and strands of strength members having strength members that are shorter in length than the optic fiber thereby allowing the optic fibers to stay strain-free until the tension members have been stressed well over 50% of their load carrying ability and a method of making such a cable.

It is a further object of this invention to provide such a cable wherein the optical fibers in the cable will stay strain-free even as sharp bends or small diameter wraps are applied to the cable because the cable construction allows the optical fibers to move toward the neutral axis as the cable is bent and a method of making such a cable.

Further, in accordance with the cable making method of this invention, a cable is produced that can be used for almost all applications of fiber optic cables. It has all the advantages of the loose tube buffer construction in a tight tube buffer configuration. This allows the cable to be used outdoors since it can tolerate a wide range of temperatures. It is also very lightweight so it can be used in aerial applications without the use of messenger cables. It also can be used in conduit or direct barrier arrangements and has advantages of the tight buffer tube and flexibility, simplicity of handling and buffer protection. In summary, the fiber optic cable produced by the method of this invention has the advantages of the tight tube buffer construction plus the flexibility, ease of handling, and buffer protection of the loose buffer construction and the tight buffer construction.

It is a further object of this invention to provide a method of manufacturing a fiber optic cable in which two or more optical fibers, clad in a tight buffer tube, will be surrounded by and spaced apart by the fibers of two strands of reinforcing material, such as Kevlar, that are shorter than the optic fibers so that substantially all of the tensile load placed on the cable will be taken by the tension members before any stress is placed on the optical fibers. The twisted optic fibers and strands of fibrous tensile material are wrapped with tape to hold the fibrous tensile material loosely in position around the optic fibers to keep the optic fibers separated while allowing the fibers to move toward the longitudinal axis as the cable is bent to reduce the stress induced in the fibers by the bend in the cable. A binder is wrapped over the tape that will bond to the outer jacket when applied so that any tensile load placed in the jacket will be transferred to the binder and then to the core of the cable thereby reducing the tendency of the jacket to stretch.

These and other objects, advantages, and, features of this invention will be apparent to those skilled in the art from a consideration of the specification including the attached drawings and appended claims.

IN THE DRAWINGS

FIG. 1 is a side view of a conventional cable making apparatus that can be used in the manufacture of the cable of this invention in accordance with the method of this invention.

FIG. 2 is a sectional view taken along line 2—2 of FIG. 1 showing the arrangement of the guide holes through which the optic fibers and strands of reinforcing material are fed during the cable making process.

FIGS. 3, 4, 6, 8, and 10 are sectional views showing the change in the cross-section of the cable during various steps of the method of this invention.

FIGS. 5, 7, 9, and 11 are side views of the cable as its cross-sectional changes as shown in FIGS. 4, 6, 8, and 10.

Figure 12:
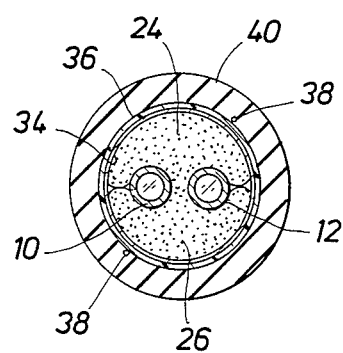

FIG. 12 is a cross-sectional view of the finished cable manufactured in accordance with this invention.

As stated above, conventional cable making machinery can be used to make the cable of this invention. Shown in FIG. 1 is layer plate 18 of such apparatus. The plate rotates through the various strands of material as they pass through holes in the plate and guide ring 20 to cause them to be twisted or laid into the desired lay configuration. In accordance with this invention, optic fibers 10 and 12, clad in a tight buffer tube, are fed through openings 14 and 16 in the layer plate, which is rotated by shaft 22. Also being fed through plate 18 are strands 24 and 26 of fibrous material that function as the tensile load carrying members of the cable. Kevlar is the preferred material although depending upon the application, such material as steel wire, fiberglass, epoxy rods or plastic coated braided steel wire, could be used as long as each strand 24 and 26 is made up of a large number of loose threads of the material that run generally parallel to each other along the length of the strands.

It is an important feature of this invention that the strands of fibrous material, which will be referred to hereinafter as Kevlar, come together first before the optic fibers began to be twisted around the longitudinal axis of the cable. This is accomplished by feeding the strands of Kevlar through openings 28 and 30 that are located closer to the center of plate 18 than are holes 14 and 16 through which the optic fibers pass. In FIG. 1, the Kevlar strands and the optic fibers are shown in the same plane whereas actually they are in planes that are rotated 90° from each other with the optic fibers and the Kevlar strands being fed from opposite sides of the longitudinal axis of the plate 18 and the longitudinal axis of the cable.

As shown in FIG. 2, the distance from the center of the plate for openings 28 and 30 is D1, which is substantially smaller than the distance openings 14 and 16 are from the center, which is D2. This results in the serve angle, i.e., the angle at which the strands approach guide ring 32 being different with the serve angle A of the optic fibers being larger than serve angle B of the Kevlar strands. As a result, the Kevlar strands are served at a lower degree of twist than that of the optic fibers allowing the Kevlar to gather before the optic fibers. Therefore, when the strands and optic fibers first come together at guide ring 32, they will be positioned more or less as shown in FIG. 3 with strands 24 and 26 of Kevlar substantially in contact while optic fibers 10 and 12 are spaced apart on opposite sides of the Kevlar strands. The difference in the serve angle causes the Kevlar strands to be shorter than the optic fibers. This allows the optic fibers to remain stress free when the cable is subjected to a tensile load.

As rotating disc 18 causes the four members to be twisted together, they will take positions as shown in FIG. 4, where the optic fibers 10 and 12 have moved together but they are still held apart by material from both strands 24 and 26.

Figure 6:
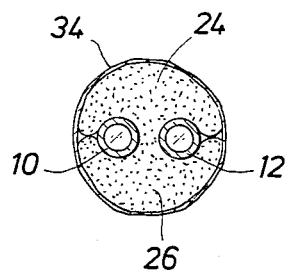
Figure 7:
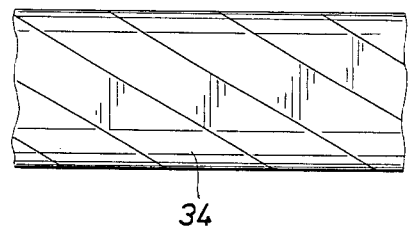
Figure 8:
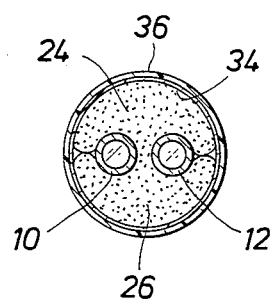
Figure 9:
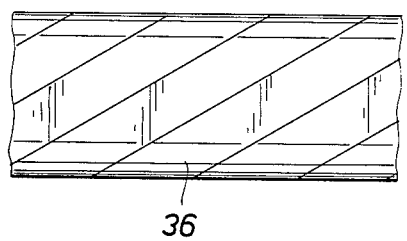
Figure 10:
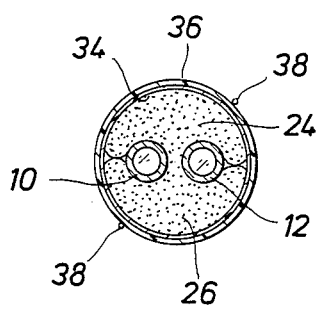
Figure 11:
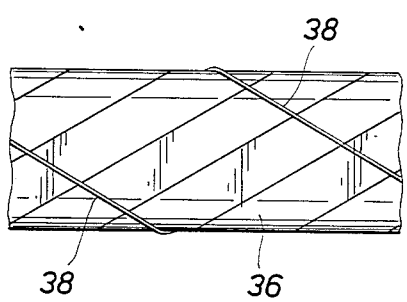

The next step in the method of this invention is to wrap the twisted strands of Kevlar and the optic fibers with a tape that will tend to pull the Kevlar strands more toward a position completely surrounding the optic fibers as shown in FIG. 6. The tape, indicated by the number 34 in FIGS. 6 and 7, is preferably a non-woven material having a soft finish and one that is highly flexible. Better results are obtained if the lay of the tape is opposite that of the Kevlar strands and the optic fibers.

A second tape 36 is then wrapped around the cable core in the opposite direction from tape 34. This tape should have a harder finish and be somewhat stiffer. Mylar tape is one that is used. This tape is to secure tape 34 in position and provide somewhat of a loose tube effect to the optic fibers embedded in the Kevlar strands.

In a preferred embodiment, after tape 36 has been applied, binder thread 38 is wrapped around the outside of tape 36. This binder thread should be of a material that will bond to whatever material is to be used for the outer jacket. In this way, the binder thread will resist relative longitudinal movement between the outer jacket and the inner core of the cable and thus reduce the stretching of the outer jacket when it is subjected to tensile load.

FIG. 12 is a cross-section of a finished cable with outer jacket 40 having been extruded over the outside of the built-up members described above. As such, optic fibers 10 and 12 are nested in a body of Kevlar fibers. The Kevlar fibers provide a cushion that protects the optic from crushing forces imposed on the cable. The Kevlar fibers also allow the optic fibers to move laterally relative to each other when the cable is bent to reduce the stress imposed on the optic fibers.

From the foregoing it will be seen that this invention is one well adapted to attain all of the ends and objects hereinabove set forth, together with other advantages which are obvious and which are inherent to the method and product.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A method of making a fiber optic cable comprising the steps of laying two optical fibers and two strands of fibers with the optical fibers being fed by the layer from opposite sides of the axis of rotation of the layer and the two strands of fibers being fed from opposite sides of the axis of rotation of the layer, closer to the axis of rotation and at 90° to the optical fibers to cause the optical fibers to be separated by portions of the fibers in the strands and for the strands to be shorter in length than the optic fibers and covering the optic fibers and the strands with an outer jacket.

2. The method of claim 1 in which prior to covering the optic fibers and the strands with an outer jacket wrapping the optic fibers and strands with a flexible tape to pull the fibers of the strands around the outside of the optic fibers to provide cushioning on all sides of the optic fibers.

3. The method of claim 2 in which the tape is wrapped in the opposite direction of the lay of the optic fibers and the strands.

4. The method of claim 2 further including the step of wrapping a second tape over the first tape to help hold the first tape in position to hold the strands of fiber around the optic fibers.

5. The method of claim 4 in which the second tape is wrapped with a lay opposite the lay of the first tape.

6. The method of claims 2, 3, 4, or 5 further including the step of wrapping a binder thread around the outside of the tape, the binder thread being of a material that will bond to the outer jacket and tend to hold the jacket from stretching when the jacket is placed in tension.

7. The method of claim 1 further including the step of extruding a tight buffer tube over the optical fibers before laying the optical fibers with the fiber strands.

8. The method of claim 1 in which the fibers of the strands are made of Kevlar.

9. A method of making a cable having two optical fibers spaced apart by portions of two strands of fibers laid with the optical fibers comprising the steps of laying two optical fibers and two strands of fibers with the serve angle of the strands of fiber being less than the serve angle of the optical fibers and at 90° thereto to cause the optical fibers to be held apart by portions of the fibers making up the strands and enclosing the laid optical fibers and the fiber strands in an outer jacket.

10. The method of claim 9 in which prior to covering the optic fibers and the strands in the outer jacket wrapping the optic fibers and strands with a flexible tape to pull the fibers of the strands around the outside of the optic fibers to provide cushioning on all sides of the optic fibers.

11. The method of claim 10 in which the tape is wrapped in the opposite direction of the lay of the optic fibers and the strands.

12. The method of claim 10 further including the step of wrapping a second tape over the first tape to help hold the first tape in position to hold the strands of fiber around the optic fibers.

13. The method of claim 12 in which the second tape is wrapped with a lay opposite the lay of the first tape.

14. The method of claims 11 or 12 further including the step of wrapping a binder thread around the outside of the tape, the binder thread being of a material that will bond to the outer jacket and tend to hold the jacket from stretching when the jacket is placed in tension.

15. The method of claim 9 further including the step of extruding a tight buffer tube over the optical fibers before laying the optical fibers with the fiber strands.

16. The method of claim 9 in which the fibers of the strands are made of Kevlar.

17. A fiber optic cable made by laying two optical fibers and two strands of fibers with the optical fibers being fed by the layer from opposite sides of the axis of rotation of the layer and the two strands of fibers being fed from opposite sides of the axis of rotation of the layer, closer to the axis of rotation, and at 90° to the optical fibers to cause the optical fibers to be separated by portions of the fibers in the strands and for the strands to be shorter in length than the optic fibers, and covering the optic fibers, and the strands with an outer jacket.

18. The fiber optic cable of claim 17 in which prior to covering the optic fibers and the strands with an outer jacket wrapping the optic fibers and strands with a flexible tape to pull the fibers of the strands around the outside of the optic fibers to provide cushioning on all sides of the optic fibers.

19. The fiber optic cable of claim 18 in which the tape is wrapped in the opposite direction of the lay of the optic fibers and the strands.

20. The fiber optic cable of claim 18 further including the step of wrapping a second tape over the first tape to help hold the first tape in position to hold the strands of fiber around the optic fibers.

21. The fiber optic cable of claim 20 in which the second tape is wrapped with a lay opposite the lay of the first tape.

22. The fiber optic cable of claims 18, 19, 20, or 21 further including the step of wrapping a binder thread around the outside of the tape, the binder thread being of a material that will bond to the outer jacket and tend to hold the jacket from stretching when the jacket is placed in tension.

23. The fiber optic cable of claim 17 further including the step of extruding a tight buffer tube over the optical fibers before laying the optical fibers with the fiber strands.

24. The method of claim 17 in which the fibers of the strands are made of Kevlar.

25. A fiber optic cable having two optical fibers spaced apart by portions of two strands of fibers laid with the optical fibers made by laying two optical fibers and two strands of fibers with the serve angle of the strands of fiber being less than the serve angle of the optical fibers and at 90° thereto to cause the optical fibers to be held apart by portions of the fibers making up the strands and enclosing the laid optical fibers and the fiber strands in an outer jacket.

26. The method of claim 25 in which prior to covering the optic fibers and the strands in the outer jacket wrapping the optic fibers and strands with a flexible tape to pull the fibers of the strands around the outside of the optic fibers to provide cushioning on all sides of the optic fibers.

27. The method of claim 26 in which the tape is wrapped in the opposite direction of the lay of the optic fibers and the strands.

28. The method of claim 26 further including the step of wrapping a second tape over the first tape to help hold the first tape in position to hold the strands of fiber around the optic fibers.

29. The method of claim 28 in which the second tape is wrapped with a lay opposite the lay of the first tape.

30. The method of claims 27 or 28 further including the step of wrapping a binder thread around the outside of the tape, the binder thread being of a material that will bond to the outer jacket and tend to hold the jacket from stretching when the jacket is placed in tension.

31. The method of claim 25 further including the step of extruding a tight buffer tube over the optical fibers before laying the optical fibers with the fiber strands.

32. The method of claim 25 in which the fibers of the strands are made of Kevlar.

33. A fiber optic cable comprising a pair of optic cables and two strands of fibrous material twisted together with the strands of fibrous material having a lower degree of twist than the optical fibers to cause a portion of the fibrous material to be positioned between the optical fibers, and an outer jacket covering the optical fibers and the strands of fibrous material.

34. The cable of claim 33 further provided with a flexible tape inside the outer jacket and wrapped around the optical fibers and the strands of fibrous material.

35. The cable of claim 34 in which the tape is wrapped with a lay opposite that of the optical fibers and the strands of fibrous material.

36. The cable of claim 34 further including a second tape wrapped over the first tape to help hold the first tape in position to hold the strands of fiber around the optic fibers.

37. The cable of claim 36 in which the second tape is wrapped with a lay opposite the lay of the first tape.

38. The cable of claims 34, 35, 36, or 37 further including a binder thread wrapped around the outside of the tape, the binder thread being of a material that will bond to the outer jacket and tend to hold the jacket from stretching when the jacket is placed in tension.

39. The cable of claim 33 further including a tight buffer tube extruded over the optical fibers before laying the optical fibers with the fiber strands.

40. The cable of claim 33 in which the fibers of the strands are made of Kevlar.

41. A cable comprising two optical fibers and two strands of fibrous material laid together with the fibrous material between and substantially surrounding each of the optical fibers and an outer jacket enclosing the optical fibers and the strands of fibrous material.

42. The cable of claim 41 further provided with an elongated tape wrapped around the optic fibers and the strands of fibrous material inside the jacket to help move the fibers of the strands around the optic fibers.

43. The cable of claim 42 in which the tape is wrapped around the optical fibers and the strands of fibrous material in a direction opposite of the lay of the optical fibers and the strands of fibrous material.

44. The cable of claim 42 in which the tape is made of non-woven material having a soft finish.

45. The cable of claim 42 further provided with an outer tape wrapped around the first mentioned tape to help hold the first mentioned tape in place.

46. The cable of claim 45 in which the outer tape is wrapped with a lay opposite that of the first mentioned tape.

47. The cable of claims 42, 43, 44, 45, or 46 further provided with a binder thread wrapped around the outside of the tape and bonded to the outer jacket to tend to hold the jacket from stretching when the jacket is placed in tension.

48. The cable of claims 41, 42, 43, 44, 45, or 46 in which the optical fibers are covered by a tight buffer tube.

49. The cable of claims 41, 42, 43, 44, 45, or 46 in which the fibrous material of the strands is Kevlar.

50. The cable of claim 41 in which the strands of fibrous material are shorter than the optic fibers.

* * * * *